INVENTORS
CLINTON R. HANNA,
LAWRENCE B. LYNN.
BY
ATTORNEY

INVENTORS
CLINTON R. HANNA,
LAWRENCE B. LYNN.

Patented Aug. 19, 1947

2,425,737

UNITED STATES PATENT OFFICE 2,425,737

GYROSCOPE CONTROLLED ANTENNA STABILIZER

Clinton R. Hanna, Pittsburgh, and Lawrence B. Lynn, Wilkinsburg, Pa., assignors to Westinghouse Electric Corporation, East Pittsburgh, Pa., a corporation of Pennsylvania Application May 22, 1944, Serial No. 536,738

11 Claims. (Cl. 172—239)

The invention relates to a support for any suitable device having a predetermined or sighting axis and it has for an object to provide apparatus of this character constructed and arranged to position the device whether or not the support is being moved in train and irrespective of rolling and pitching movements of the structure upon which the support is mounted.

While the invention is susceptible of any suitable application, it is being used in connection with short-wave radio antennas mounted on board ship and it serves to keep such an antenna positioned with its reflector axis horizontal irrespective of rolling and pitching of the ship. The parabolic reflector of such an antenna is pivotally connected to a support about an axis which is at right angles to the reflector or sighting axis and which is in a plane normal to the train axis. Gyro supporting structure is also pivotally carried by the support about an axis parallel to the reflector pivot axis and the reflector or member and the supporting structure are connected for parallel motion. A gyro is mounted on the supporting structure and it is construced and arranged so that, with gravitational constraint imposed thereon, it constitutes a reference with respect to the vertical plane containing the supporting structure pivot axis for the control of servo-motor means operative to maintain the gyro supporting structure and the member or reflector positioned with the sighting axis of the latter substantially horizontal.

A further object of the invention is to provide a body mounted for movement in train and pivotally carrying a member having a sighting axis and a gyro supporting structure about parallel axes with the member pivot axis normal to its sighting axis and in a plane normal to the train axis, parallel-motion mechanism connecting the gyro supporting structure and the member for angular movement in the same direction and to the same extent, and a gyro carried by the supporting structure and controlling servo-motor means operative to position the supporting structure and the member so that a predetermined axis of the latter is maintained substantially in the horizontal.

A further object of the invention is to provide a member positioned to keep an axis thereof horizontal by means of a motor under control of a gyro constructed and arranged to provide a vertical plane of reference.

These and other objects are effected by the invention as will be apparent from the following description and claims taken in connection with the accompanying drawings, forming a part of this application, in which:

Figure 1:
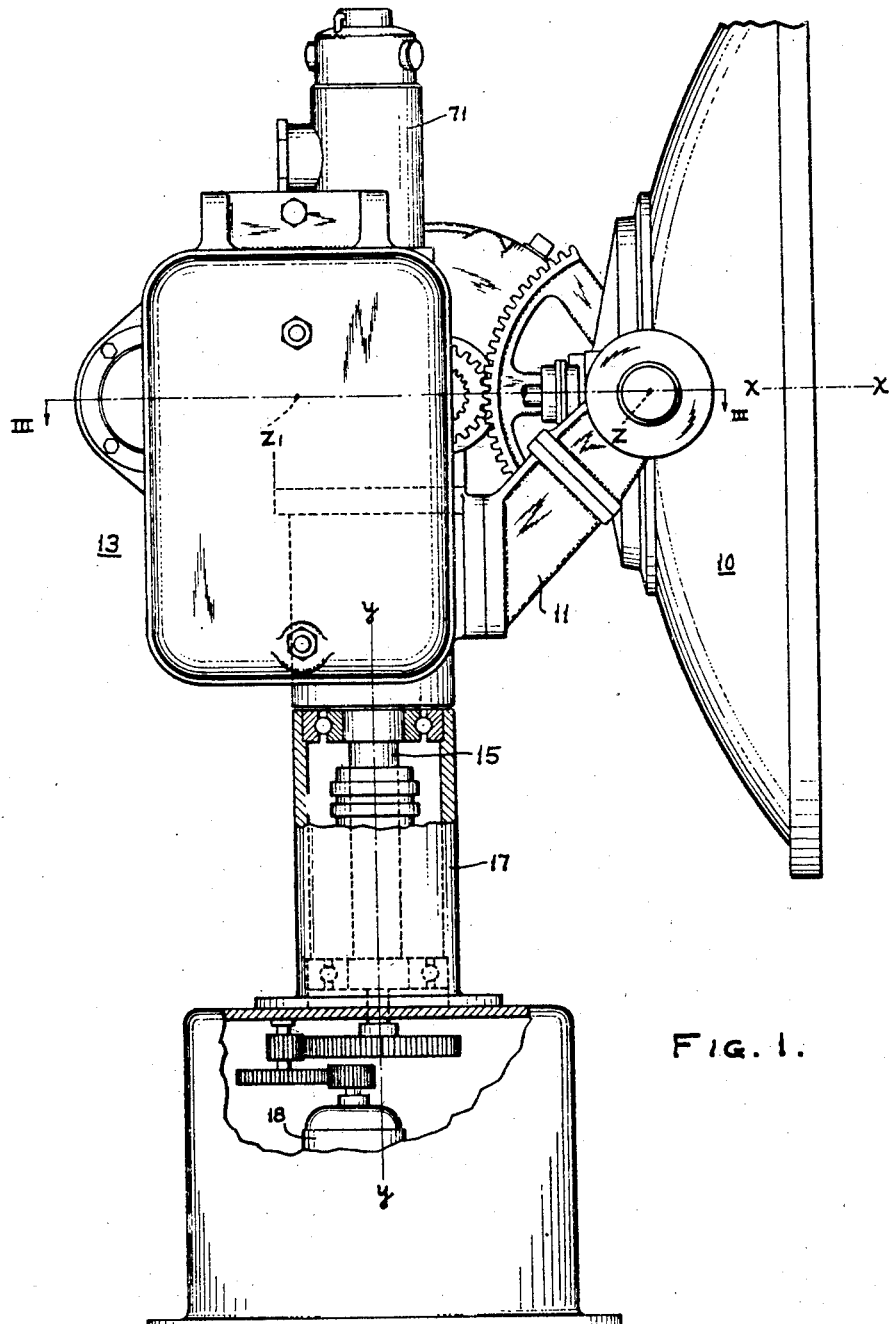
Fig. 1 is an elevational view of the improved apparatus.
Figure 2:
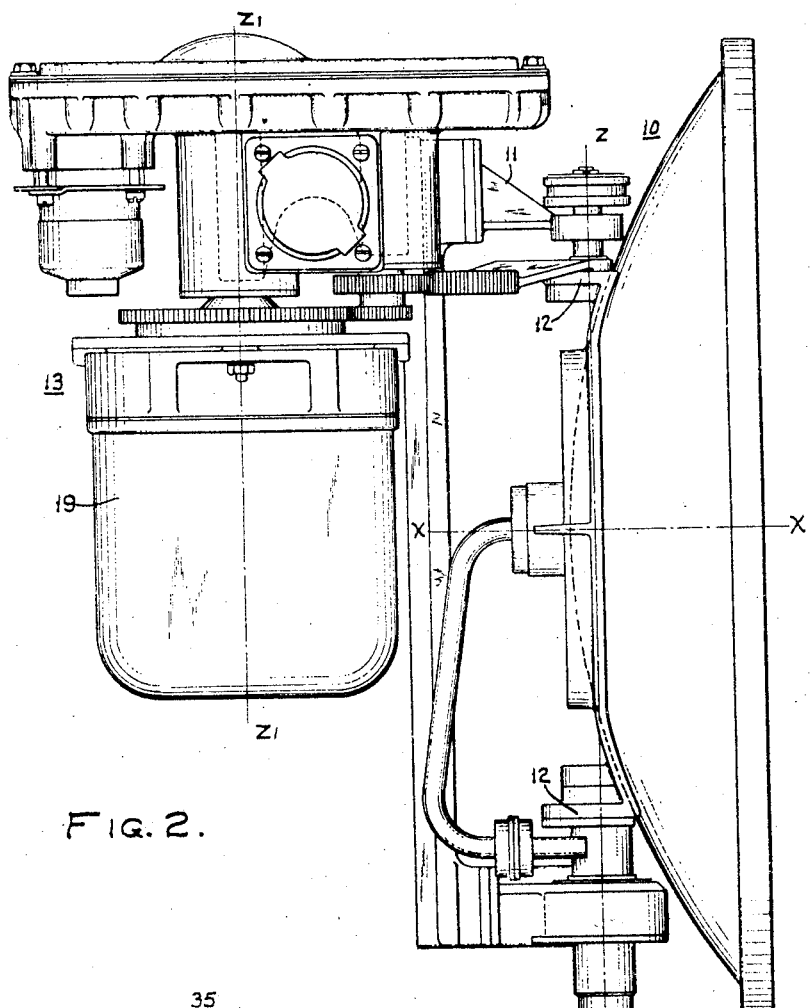
Fig. 2 is a plan view of apparatus shown in Fig. 1.
Figure 3:
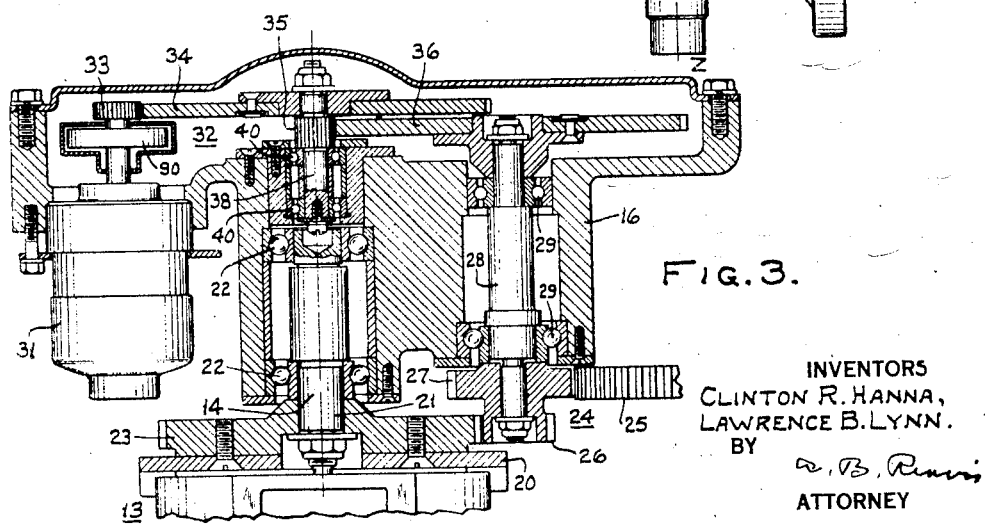
Fig. 3 is a view taken along the line III—III of Fig. 1 and showing the gearing.
Figure 4:
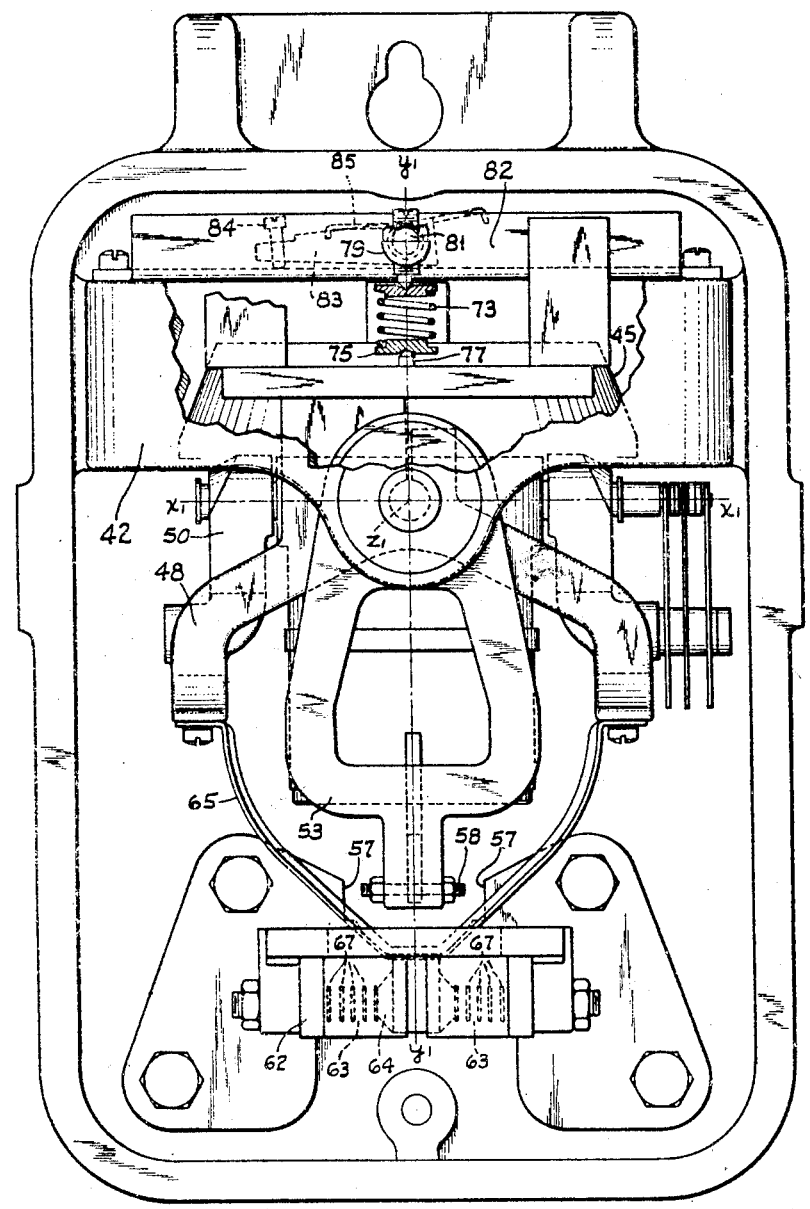
Fig. 4 is a detail view showing the gyro in end elevation.
Figure 5:
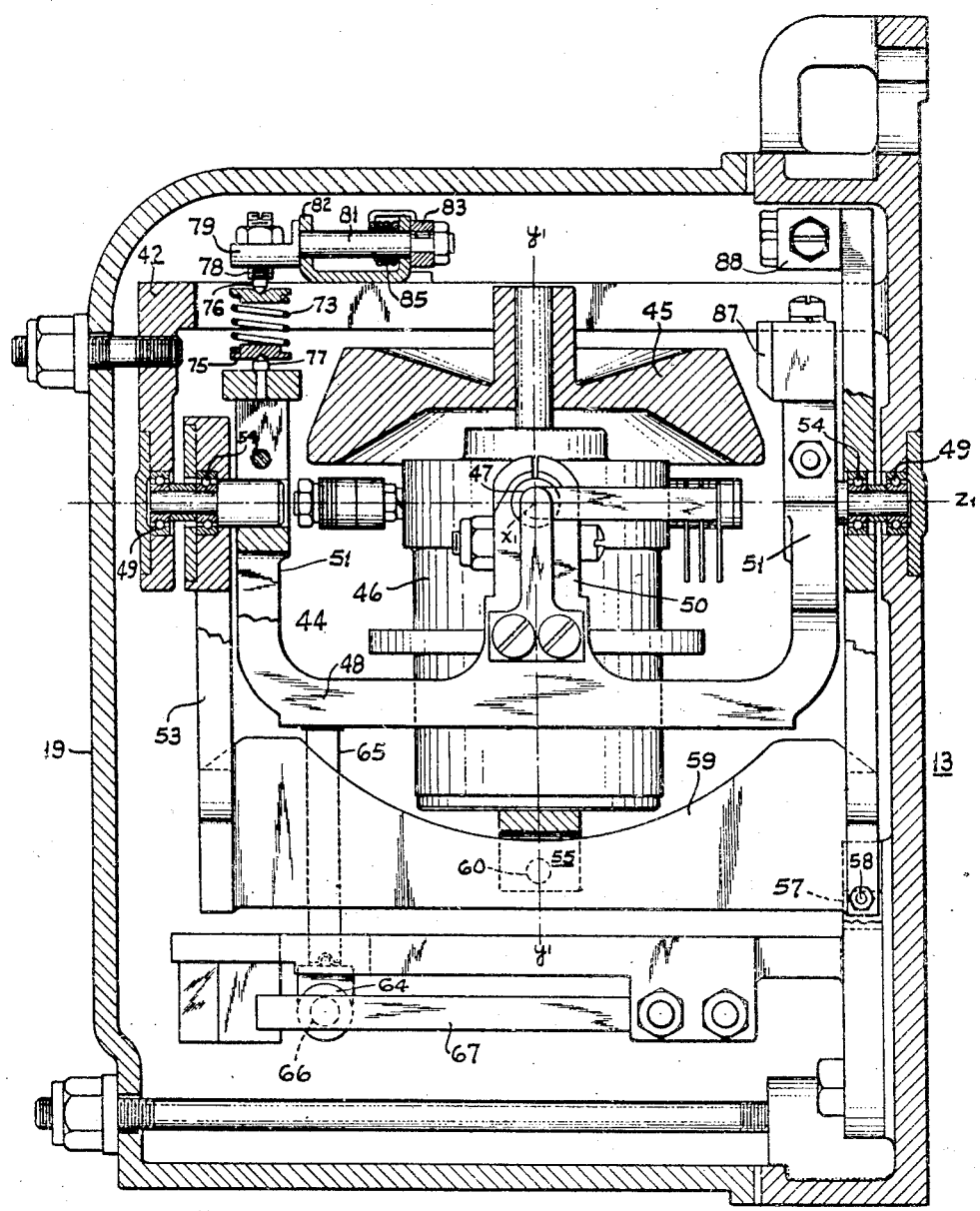
Fig. 5 is a detail view showing the gyro partly in section and partly in side elevation.
Figure 6:
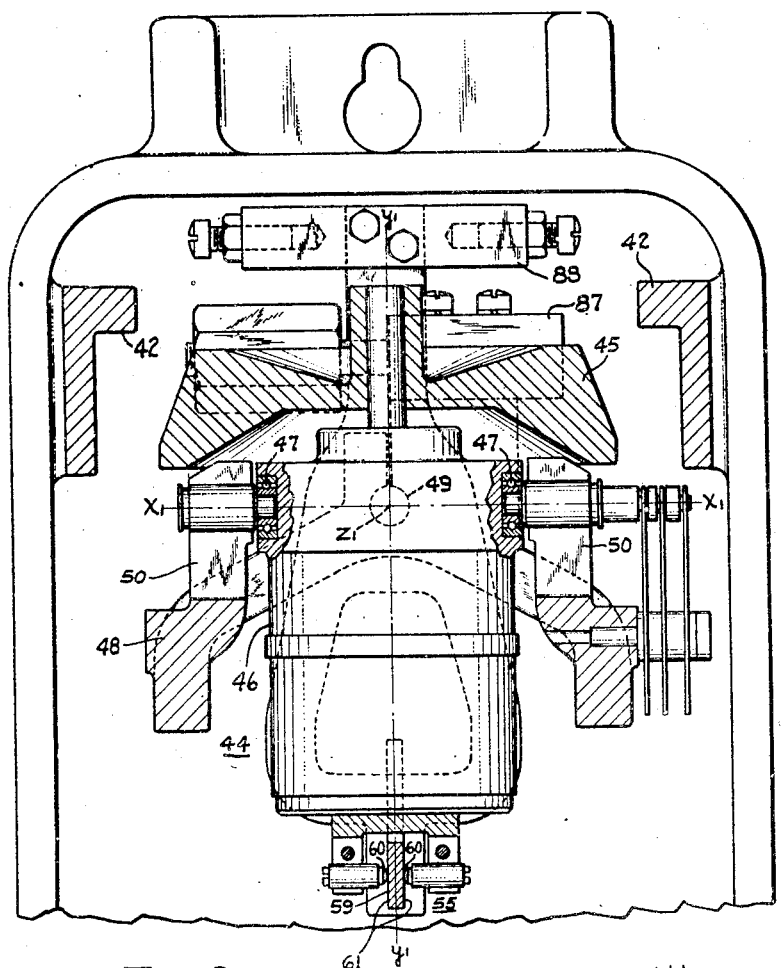
Fig. 6 is a fragmentary view of the gyro showing parts of the latter in transverse section.

Referring now to the drawings more in detail, there is shown a member, at 10, such as a parabolic antenna reflector having a sighting axis indicated at $x$—$x$ in Figs. 1 and 2. The member or reflector, at 10, is carried by the supporting body or structure 11, it being pivotally connected to the latter by any suitable means 12 having a pivot axis $z$—$z$ which is at right angles to the sighting axis $x$—$x$. The gyro supporting structure, at 13, is mounted on the supporting body by pivot means 14 whose pivot axis $z_1$—$z_1$ is arranged parallel to the axis $z$—$z$.

The supporting body or structure 11 includes a shank 15 and a gear casing 16 at the upper end of the latter, the shank being mounted for training movement about its longitudinal axis $y$—$y$.

As shown, the shank 15 of the supporting structure is pivotally carried by suitable pedestal mounting means 17 for attachment to any suitable structure of a ship. The pedestal mounting means is provided with a suitable motor 18, by means of which the supporting body 11 may be moved in train for scanning purposes.

The gyro supporting structure, at 13, includes a casing 19 and a mounting plate 20 carried by a spindle 21 pivotally mounted within the gear casing structure 16 by suitable anti-friction bearings 22.

The gyro supporting structure, at 13, is connected to the member or reflector, at 10, by any suitable parallel motion mechanism, a gear train being shown for this purpose. The gear train includes a gear 23 connected to the mounting plate 20 and the spindle 21, it meshing with the pinion, at 24, which, in turn, meshes with a sector rack 25 attached to the member or reflector, at 10, so that its axis is coincident with the axis $z$—$z$ of the pivot means 12.

Preferably the pinion 24 includes portions 26 and 27 of smaller and larger diameter, the portion 26 meshing with the gear 23 and the portion 27 meshing with the sector 25, it being obvious that the gear ratio should be such as to provide for angular movement of the gyro supporting structure, at 13, and of the member or reflector, at 10, to the same extent and in the same direction. As shown, the pinion, at 24, is carried by one end of a spindle 28 pivotally mounted by means of anti-friction bearings 29 in the casing structure 16.

The gyro supporting structure, at 13, and the reflector or member, at 10, are moved about the parallel axes $z$—$z$ and $z_1$—$z_1$ by servo-motor means including a motor 31 connected thereto by reduction gearing, at 32, arranged in the gear casing, the motor being carried by the casing structure 16.

Preferably, the reduction gearing includes a pinion 33 driven by the motor and meshing with a gear 34 coaxial with the pinion 35, which, in turn, meshes with the gear 36 connected to the spindle 28, whereby motion is transmitted from the motor at reduced speed to the gear train connecting the gyro supporting structure and the reflector or member for parallel movement. To promote quietness and smoothness of action, the gears 34 and 36 are preferably of the fiber type. The coaxial gear 34 and pinion 35 are mounted on a stud 38 carried by spaced anti-friction bearings 40 mounted in the casing structure 16 so that the stud 38 and the spindle 21 are kept in coaxial relation.

Within the casing 19, the gyro supporting structure, at 13, is provided with a frame element 42 and the casing encloses the gyro, at 44.

The gyro, at 44, includes a rotor 45 rotatably carried by an inner frame or casing 46 supported by pivot or gimbal bearings 47 from the gimbal ring 48, which, in turn, is supported by means of pivot or gimbal bearings 49 from the frame element 42 and one wall of the casing 19, such frame element and wall constituting component parts of the gyro supporting structure, at 13.

As shown, the gimbal ring 48 has upwardly-extending standard portions 50 for the pivot bearings 47 and upwardly-extending standard portions 51 for the pivot bearings 49 to provide ample clearance for the gyro and associated parts. Thus, the gyro has three degrees of freedom, the inner gimbal axis $x_1$—$x_1$ defined by the pivots 47 being normal both to the spin axis $y_1$—$y_1$ and to the outer gimbal axis $z_1$—$z_1$ defined by the axis of the pivots 49. These axes intersect at a common point and the outer gimbal axis $z_1$—$z_1$ is coincident with the axis of the pivotal connection between the gyro supporting structure and the supporting body, at 11.

The gyro, at 44, has means for biasing it to a central position. As shown, this purpose is achieved by making the gyro pendulous, gravity giving to the spin axis $y_1$—$y_1$ a vertical-seeking tendency; however, acceleration pressures to which it is subject about the axis $z_1$—$z_1$ tend to cause precession about the axis $x_1$—$x_1$ and friction means is employed to damp precessional oscillations.

To provide for friction damping, a pendulum 53 is supported by pivot bearings 54 coaxial with the bearings 49 and the outer gimbal axis $z_1$—$z_1$, and a coupling, at 55, between the gyro and the pendulum is constructed and arranged to provide for precessional movement of the gyro about the inner gimbal or precession axis $x_1$—$x_1$. Cooperating stops 57 and 58 carried by the gyro supporting structure and the pendulum, respectively, limit the extent of relative angular movement between the pendulum and such structure.

Damping of precessional oscillations of the gyro is effected by the coupling, at 55, the latter being constituted by a plate 59 carried by the pendulum and with which cooperate adjustable shoes 60 carried by the inner frame 46 of the gyro, the plate 59 having surfaces 61 which are substantially normal with respect to the inner gimbal or precession axis $x_1$—$x_1$ and with which cooperate the adjustable shoes 60. Preferably, the shoes 60 are adjusted to provide just sufficient clearance for freedom of the gyro to precess about the inner gimbal axis $x_1$—$x_1$ in response to torque exerted thereon about the outer gimbal axis $z_1$—$z_1$.

The gyro arrangement and the pendulum so far described are, therefore, capable of operating to maintain the plane of the spin axis $y_1$—$y_1$ and of the outer gimbal axis $z_1$—$z_1$ in the vertical. Thus, there is provided a reference element by means of which servo-motor apparatus may be controlled so as to keep the directing axis $x$—$x$ substantially horizontal, that is, in perpendicular relation with respect to the reference plane. Accordingly, the gyro supporting structure, at 13, has a support 62 and such support and the gyro carry the actuated part 63 and the actuated part 64 of a control device, the actuating and actuated parts being movable relatively in opposite directions to control operation of the motor 31 in opposite directions. With one of the parts, for example, the actuating one attached to the gimbal ring 48 of the gyro, it will be apparent that it will be held with respect to the reference plane defined by the outer gimbal axis $z_1$—$z_1$ and the spin axis $y_1$—$y_1$. Now with the actuated part 63 carried by the gyro supporting structure, at 13, as movement of the latter about the outer gimbal axis $z_1$—$z_1$ occurs, incident to departure of the sighting axis $x$—$x$ from the desired relation with respect to the horizontal plane, it will be apparent that such movement is relative to the reference plane and it is effective to move the parts 64 and 63 relatively from mid-position relation in one direction or the other to energize the motor to move the directable element or member until the sighting axis $x$—$x$ is restored to the horizontal or to the desired relation thereof with respect to the latter; and, because of the mechanical connection between the directable element or member and the gyro supporting structure, the motor also drives the latter until the parts of the control device are restored to their mid-position relation, whereupon the sighting axis will be correctly positioned with respect to the vertical reference plane defined by the outer gimbal and spin axes, that is, will be correctly positioned with respect to the horizontal.

If, due to angular motion of the supporting body 11 and the gyro supporting structure, at 13, relative motion occurs between the actuating and actuated elements 64 and 63 of the control device with respect to the outer gimbal axis $z_1$—$z_1$, such control device is operated to control the motor 31 for positioning the gyro supporting structure, at 13, and the member or reflector, at 10, so as to maintain the sighting or directing axis $x$—$x$ of the latter substantially horizontal, the operation being such that relative angular displacement of the gyro supporting structure and the gyro with respect to the outer gimbal axis $z_1$—$z_1$ results in energization of the follow-up servo-motor means so that the latter operates to move the gyro supporting structure and the element or reflector until the actuator 64 has a substantially centered relation with respect to the devices 63.

Figure 7:
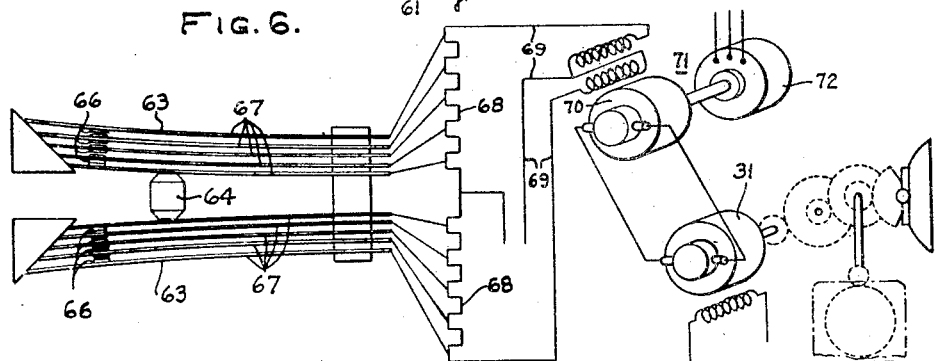
Fig. 7 is a diagrammatic view showing the servo-motor system.

As shown in Fig. 7, the actuated part 63 of the controlling device is comprised by a pair of groups of contacts 66 biased to open position by electrically-conductive spring leaves 67 tapped along a resistor 68, the contacts and resistor providing for variation of currents in a pair of controlling circuits 69, the arrangement being such that as the contacts are progressively engaged, portions of the associated resistor in circuit are progressively shunted so that the current in the circuit is increased.

The contacts are carried by the gyro supporting structure and are arranged to be opened and closed by movements in a plane extending normally with respect to the outer gimbal axis $z_1$—$z_1$. With the insulating actuator 64 interposed between the groups of contacts, it will be apparent that relative angular movements of the actuator and of the groups are productive of currents in the controlling circuits which vary differentially in opposite directions, these controlling currents being used in any suitable manner to control the motor 31.

As illustrated, the controlling circuits 69 are used to control the field of the generator 70 of a motor-generator set, at 71, having a driving motor 72, the armature current of the generator being furnished to the motor 31. The motor-generator set, at 71, is also preferably supported from the gear casing 16, as shown in Fig. 1.

As relative movements of the actuating and actuated parts 64 and 63 of the control device result in engagement of the contacts 66 with deflection of the supporting spring leaves 67, the spring force on that account is effective as a couple acting on the gyro about the outer gimbal axis $z_1$—$z_1$, and, but for compensation therefor, such couples would result in disturbing precessional effects. Compensation is effected by means of a spring 73 positioned so that its force exerts a moment with respect to the outer gimbal axis $z_1$—$z_1$ and which increases as the relative angular deviation between the gyro supporting structure and the gyro increases with increased deflection of the contact spring leaves to engage more of the contacts, the moment of the spring 73 with respect to the outer gimbal axis opposing the spring moment due to the spring leaves so as to substantially balance the latter, with the result that the contacts 66 of the groups are progressively engaged and disengaged with a negligible spring moment effect with respect to the outer gimbal axis $z_1$—$z_1$.

The compensating spring 73 is preferably of the compression type, the upper and lower ends thereof having point bearing relation with respect to frame structure 42 and the gimbal ring 48. As shown, the ends of the spring engage abutment plates 74 having sockets 75 for pointed pins 76 and 77 carried by the frame structure and the gimbal ring. The upper pin 76 has a shank 78 threaded to a support 79 and is held in position by a lock nut 80. As the support 79 is carried by the frame structure, it will be apparent that the compression of the spring 73 may be varied by adjusting the threaded shank 78. The support 79 is adjustable angularly so that the pivot point of the pin 76 may be adjusted to position the axis of the spring 73 in relation to the gimbal ring, so that, with the contact actuator 64 centered with respect to the contact groups 63, the axis of the spring intersects the outer gimbal axis. Hence, the pivot pin 76, with its support, is adjustable angularly to position the spring axis in intersecting relation with respect to the outer gimbal axis $z_1$—$z_1$ of the gyro and it is adjustable with respect to its support to vary the spring force.

To provide for angular adjustment of the support 79, the latter has a shank 81 journaled in a bracket 82 attached to the frame structure. The shank has a radial arm 83 provided with a screw 84 which may be turned to raise and lower the arm 83, the spring 85 exerting force on the arm to resist raising thereof by the screw.

The gimbal ring 48 is rendered non-pendulous by the provision of suitable counterweights 87. Also, the pendulosity of the pendulum 53 may be adjusted to a suitable extent by the provision of a counterweight 88.

The motor 31 has its shaft provided with a rotational damper, at 90, such as disclosed in our application Serial No. 524,560, filed March 1, 1944, the damper avoiding rotational effects tending to disturb the member, at 10, with the result that operation is smoother and positioning of the latter proceeds in a more settled manner.

In operation, if angular movement of the gyro supporting structure, at 13, tends to occur relative to the gyro about the outer gimbal axis $z_1$—$z_1$, the contacts 66 are actuated to control operation of the follow-up servo-motor means to render the motor 31 effective to move the gyro supporting structure, at 13, and the member or element, at 10, so as to maintain the normal positional relation of the contacts with respect to the contact actuator, that is, with the plane of the gyro spin axis and the outer gimbal axis maintained in the vertical, the apparatus will operate to keep the predetermined or sight axis $x$—$x$ of the member or reflector, at 10, substantially in a horizontal plane or perpendicular to the vertical reference plane defined by the gyro.

In order that the gyro may define a vertical reference plane for the foregoing purpose, it is necessary that gravitational constraint be imposed on the gyro; and, to provide for this, a pendulous gyro is used and a separate pendulum having a limited amount of motion relative to the supporting structure is employed for damping precessional oscillations.

Not only does the pendulum provide frictional surfaces 61 positioned gravitationally to be in proper relation with respect to the shoes 60 for damping, but acceleration pressures of the pendulum aid in the development of damping friction.

The supporting body 11 may be moved in any suitable manner, as by the motor 18, about the train axis $y$—$y$ for scanning purposes with maintenance of the sight axis substantially in the horizontal irrespective of rolling and pitching.

While the gyro is made pendulous to give it bias for a vertical plane of reference, it will be apparent that any suitable bias may be used where the plane of reference is not vertical or does not have a substantial vertical component.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. In combination, a supporting body mounted for movement about a train axis and provided with a casing structure; a member having a directing axis; a gyro supporting structure; means for pivotally supporting the member and the gyro supporting structure from said body about parallel axes with the pivot axis for the member at right angles to the directing axis of the latter; parallel-motion mechanism between the member and the gyro supporting structure and including a train of connecting gearing; a motor carried by the casing structure; a reduction gear train within the casing structure and connecting the motor to a gear element of the first train; a pendulous gyro carried by the gyro supporting structure and having its inner gimbal axis arranged at right angles to the spin axis and to its outer gimbal axis with the latter coincident with the gyro supporting structure pivot axis and cooperating with the spin axis to define a vertical reference plane; and means controlling said motor in response to angular deviations of the gyro supporting structure with respect to the reference plane provided by the gyro to drive the parallel-connected supporting structure and member to maintain said member positioned with its directing axis in predetermined angular relation with respect to the reference plane.

2. In combination, a supporting body subject to disturbing angular movements and mounted for movement about a train axis; a member having a directing axis and connected to the body about a pivot axis arranged at right angles to the directing axis and to the train axis; a gyro supporting structure connected for angular movement with the member as the latter moves about its pivot axis; a reversible rotary motor carried by the body for driving the member about its pivot axis; a pendulous gyro carried by said gyro-supporting structure and having a vertical-seeking spin axis and outer and inner gimbal axes; said spin axis extending transversely of the outer gimbal axis, the inner gimbal axis extending at right angles to the spin axis and to the outer gimbal axis, and the outer gimbal axis being in parallel relation to said pivot axis; a control device including an actuating part movable in opposite directions from mid-position relation with respect to an actuated part for controlling the motor for operation in opposite directions; means for mounting said parts of the control device on the gyro and on the gyro-supporting structure for relative movement incident to relative angular movement of the gyro-supporting structure and the gyro with respect to the outer gimbal axis to render the motor effective to drive said member about its pivot axis until the mid-position relation of said parts is restored; and means for damping precessional oscillations of the gyro about the inner gimbal axis.

3. In combination, a supporting body subject to disturbing angular movements and mounted for movement about a train axis; a member having a directing axis connected to the body about a first pivot axis arranged at right angles to the directing axis and to the train axis; a gyro-supporting structure connected to the body about a second pivot axis parallel to the first pivot axis; means for mechanically connecting the member and the gyro-supportnig structure for like simultaneous angular movements about their pivot axes; a reversible rotary motor carried by the body for driving the mechanically-connected member and gyro-supporting structure about their pivot axes; a pendulous gyro including a rotor having a vertical-seeking spin axis, a casing for the rotor, and a gimbal ring pivotally supported from the gyro-supporting structure about an outer gimbal axis and pivotally supporting the casing about an inner gimbal axis; said rotor spin axis extending transversely of the outer gimbal axis, the inner gimbal axis extending at right angles to the spin axis and to the outer gimbal axis, and the outer gimbal axis being coincident with or parallel to said second pivot axis; a control device including an actuating part movable in opposite directions from mid-position relation with respect to an actuated part for controlling the motor for operation in opposite directions; means for mounting said parts of the control device on the gyro-supporting structure and on the gimbal ring for relative movement incident to relative angular movement of the gyro-supporting structure and the gimbal ring with respect to the outer gimbal axis to render the motor effective to drive the gyro-supporting structure about the second pivot axis until the mid-position relation of said parts is restored; a member pivotally mounted about the outer gimbal axis and movable relative to the gyro support; and means cooperating with the member and with the gyro to damp precessional oscillations of the latter about the inner gimbal axis.

4. In combination, a supporting body subject to disturbing angular movements and mounted for movement about a train axis; a member having a directing axis connected to the body about a pivot axis arranged at right angles to the directing axis and to the train axis; a gyro-supporting structure connected for angular movement with the member as the latter moves about its pivot axis; a reversible rotary motor carried by the body for driving the member about its pivot axis; a pendulous gyro having a vertical-seeking spin axis and outer and inner gimbal axes; said spin axis extending transversely of the outer gimbal axis, the inner gimbal axis extending at right angles to the spin axis and to the outer gimbal axis, and the outer gimbal axis being in parallel relation with said pivot axis; a motor control device including an actuating part movable in opposite directions from mid-position relative to an actuated part and against spring resistance to control the motor for operation in opposite directions; means for mounting said parts of the control device on the gyro-supporting structure and on the gyro for relative movement incident to relative angular movement of the gyro-supporting structure and the gyro with respect to the outer gimbal axis to render the motor effective to drive the member about its pivot axis until the mid-position relation of said parts is restored; means for damping precessional oscillations of the gyro about the inner gimbal axis; and means acting on the gyro about the outer gimbal axis to neutralize to a substantial extent the effect of said spring resistance on the gyro about the latter axis.

5. In combination, a supporting body subject to disturbing angular movements and mounted for movement about a train axis; a member having a directing axis connected to the body about a first pivot axis arranged at right angles to the directing axis and to the train axis; a gyro-supporting structure connected to the body about a second pivot axis parallel to the first pivot axis; means for mechanically connecting the member and the gyro-supporting structure for like simultaneous angular movements about their pivot axes; a reversible rotary motor carried by the body for driving the mechanically-connected member and gyro-supporting structure about their pivot axes; a pendulous gyro including a rotor having a vertical-seeking spin axis, a casing for the rotor, and a gimbal ring pivotally supported from the gyro-supporting structure about an outer gimbal axis and pivotally supporting the casing about an inner gimbal axis; said rotor spin axis extending transversely of the outer gimbal axis, the inner gimbal axis extending at right angles to the spin axis and to the outer gimbal axis, and the outer gimbal axis being coincident with or parallel to said second pivot axis; a motor control device including an actuating part movable in opposite directions from mid-position relation with respect to an actuated part and against spring resistance to control the motor for operation in opposite directions; means for mounting said parts of the control device on the gyro-supporting structure and on the gimbal ring for relative movement incident to angular movement of the gyro-supporting structure and the gimbal ring with respect to the outer gimbal axis to render the motor effective to drive the gyro-supporting structure about the second pivot axis until the mid-position relation of said parts of the control device is restored; means acting on the gyro about the outer gimbal axis to neutralize the effect of said spring resistance exerted on the gyro about the latter axis; said neutralizing means comprising a spring, abutments carried by the gyro-supporting structure and by the gimbal ring and providing point bearings for the spring with the point bearing of the gimbal ring abutment eccentric to the first gimbal axis, said abutments and the spring being so arranged that the line of action of force of the latter passing through the abutment bearing points intersects the outer gimbal axis when the gyro-supporting structure and the gimbal ring are positioned for mid-position relation of said parts of the control device, and means for effecting relative adjustment of the abutments to vary the spring force; and means for damping precessional oscillations of the gyro about the inner gimbal axis.

6. In combination, a supporting body subject to disturbing angular movements and mounted for movement about a train axis; a member having a directing axis connected to the body about a first pivot axis arranged at right angles to the directing axis and to the train axis; a gyro-supporting structure connected to the body about a second pivot axis parallel to the first pivot axis; means for mechanically connecting the member and the gyro-supporting structure for like simultaneous angular movements about their pivot axes; a reversible rotary motor carried by the body for driving the mechanically-connected member and gyro-supporting structure about their pivot axes; a pendulous gyro including a rotor having a vertical-seeking spin axis, a casing for the rotor, and a gimbal ring pivotally supported from the gyro-supporting structure about an outer gimbal axis and pivotally supporting the casing about an inner gimbal axis; said rotor spin axis extending transversely of the outer gimbal axis, the inner gimbal axis extending at right angles to the spin axis and to the outer gimbal axis, and the outer gimbal axis being coincident with or parallel to said second pivot axis; a motor control device including an actuating part movable in opposite directions from mid-position relation with respect to an actuated part and against spring resistance to control the motor for operation in opposite directions; means for mounting said parts of the control device on the gyro-supporting structure and on the gimbal ring for relative movement incident to angular movement of the gyro-supporting structure and the gimbal ring with respect to the outer gimbal axis to render the motor effective to drive the gyro-supporting structure about the second pivot axis until the mid-position relation of said parts of the control device is restored; means acting on the gyro about the outer gimbal axis to neutralize the effect of said spring resistance exerted on the gyro about the latter axis; said neutralizing means comprising a spring, abutments carried by the gyro-supporting structure and by the gimbal ring and providing point bearings for the spring with the point bearing of the gimbal ring abutment eccentric to the first gimbal axis, and means for effecting relative adjustment of the abutments to vary the spring force and to position the line of action of the latter passing through the abutment bearing point so that, with the gyro-supporting structure and the gimbal ring positioned for mid-position relation of said parts of the control device, such line of action intersects the outer gimbal axis; and means for damping precessional oscillations of the gyro about the second gimbal axis.

7. In combination, a supporting body subject to disturbing angular movements and mounted for movement about a train axis; a member having a directing axis connected to the body about a pivot axis arranged at right angles to the directing axis and to the train axis; a gyro-supporting structure connected for movement with the member as the latter moves about its pivot axis; a reversible rotary motor carried by the body for driving the member about its pivot axis; a pendulous gyro carried by said gyro-supporting structure and having a vertical-seeking spin axis and outer and inner gimbal axes; said spin axis extending transversely of the outer gimbal axis, the inner gimbal axis extending at right angles to the spin axis and to the outer gimbal axis, and the outer gimbal axis being in parallel relation with said pivot axis; a control device including an actuating part movable in opposite directions from mid-position relation with respect to an actuated part for controlling the motor for operation in opposite directions; means for mounting said parts of the control device on the gyro and on the gyro-supporting structure for relative movement incident to relative angular movement of the gyro-supporting structure and the gyro with respect to the outer gimbal axis to render the motor effective to drive the member about its pivot axis until the mid-position relation of said parts is restored; a pendulous member pivotally carried by the gyro-supporting structure about the outer gimbal axis and provided with a pair of friction surfaces extending in parallel relation to each other and to such gimbal axis; and friction shoes movable with the gyro about the inner gimbal axis and relative to the friction surfaces; said friction shoes and surfaces being engageable with normal force due to gyroscopic action to provide friction torque effective on the gyro about the inner gimbal axis to damp precessional oscillations proportionately to precessional velocity.

8. Apparatus as claimed in claim 7 with stops carried by the gyro-supporting structure and cooperating with the pendulous member for limiting the amplitude of swing of the latter relative to the gyro-supporting structure.

9. In combination, a member pivotally mounted on a supporting body subject to disturbing movements; a gyro support movable angularly with the member as the latter moves about its mounting pivot axis; a gyro including a rotor having a vertical-seeking spin axis, a casing for the rotor, a gimbal ring pivotally supported from the gyro support about an outer gimbal axis in parallel relation with respect to said mounting pivot axis and pivotally supporting the casing about an inner gimbal axis at right angles both to the spin axis and to the outer gimbal axis; a reversible rotary motor for driving said member about the mounting pivot axis; a control device including an actuating part movable in opposite directions from mid-position relation with respect to an actuated part for controlling the motor for operation in opposite directions; means for mounting the parts of said control device on the gyro support and on the gimbal ring for relative movement in response to relative angular movement of the gyro support and the gimbal ring about the outer gimbal axis to render the motor effective to drive the member to effect movement of the gyro support about the outer gimbal axis until the mid-position relation of said parts is restored; and means including a member pendulously mounted about the outer gimbal axis and cooperating with the gyro to damp precessional oscillations of the latter about the inner gimbal axis.

10. In combination, a member pivotally mounted on a supporting body subject to disturbing movements; a gyro support movable angularly with the member as the latter moves about its mounting pivot axis; a gyro including a rotor having a vertical-seeking spin axis, a casing for the rotor, a gimbal ring pivotally supported from the gyro support about an outer gimbal axis in parallel relation with respect to said mounting pivot axis and pivotally supporting the casing about an inner gimbal axis at right angles both to the spin axis and to the outer gimbal axis; a reversible rotary motor for driving said member about the mounting pivot axis; a control device including an actuating part movable in opposite directions from mid-position relation with respect to an actuated part for controlling the motor for operation in opposite directions; means for mounting the parts of said control device on the gyro support and on the gimbal ring for relative movement in response to relative angular movement of the gyro support and the gimbal ring about the outer gimbal axis to render the motor effective to drive the member to effect movement of the gyro support about the outer gimbal axis until the mid-position relation of said parts is restored; a pendulous member pivotally carried by the gyro support about the outer gimbal axis and provided with a pair of friction surfaces which are parallel to each other and to the outer gimbal axis; and friction shoes movable with the gyro about the inner gimbal axis and relative to the friction surfaces; said friction shoes and surfaces being engageable with normal force due to gyroscopic action to provide friction torque effective about the inner gimbal axis to damp precessional oscillations proportionately to precessional velocity.

11. In combination, a member pivotally mounted on a supporting body subject to disturbing movements; a gyro support movable angularly with the member as the latter moves about its mounting pivot axis; a gyro including a rotor having a vertical-seeking spin axis, a casing for the rotor, a gimbal ring pivotally supported from the gyro support about an outer gimbal axis in parallel relation with respect to said mounting pivot axis and pivotally supporting the casing about an inner gimbal axis at right angles both to the spin axis and to the outer gimbal axis; a reversible rotary motor for driving said member about the mounting pivot axis; a motor control device including an actuating part movable in opposite directions from mid-position relative to an actuated part and against spring resistance to control the motor for operation in opposite directions; means for mounting the parts of said control device on the gyro support and on the gimbal ring for relative movement in response to relative angular movement of the gyro support and the gimbal ring about the outer gimbal axis to render the motor effective to drive the member to effect movement of the gyro support about the outer gimbal axis until the mid-position relation of said parts is restored; means for damping precessional oscillations of the gyro about the inner gimbal axis; and a spring arranged between the gyro support and the gimbal ring for exerting force on the latter such that the line of action of such force intersects the outer gimbal axis when the gyro support and the gimbal ring are positioned for the mid-position relation of said parts of the control device and passes at one side or the other of such gimbal axis and at a distance from the latter dependent upon the direction and extent of relative movement of said parts of the control device from the mid-position relation in order to neutralize to a substantial extent the effect of said spring resistance exerted on the gyro about the outer gimbal axis.

CLINTON R. HANNA.
LAWRENCE B. LYNN.

REFERENCES CITED

The following references are of record in the file of this patent:

UNITED STATES PATENTS

| Number | Name | Date |
|---|---|---|
| 559,904 | Pfatischer | May 12, 1896 |
| 2,368,628 | Bates | Feb. 6, 1945 |
| 2,344,126 | Carlson | Mar. 14, 1944 |
| 1,731,776 | Henry | Oct. 15, 1929 |

FOREIGN PATENTS

| Number | Country | Date |
|---|---|---|
| 33,738 | Netherlands | Oct. 15, 1934 |
| 425,034 | Great Britain | Aug. 2, 1933 |
| 20,373 | Great Britain | 1910 |

Certificate of Correction

Patent No. 2,425,737.  August 19, 1947.

CLINTON R. HANNA ET AL.

It is hereby certified that error appears in the printed specification of the above numbered patent requiring correction as follows: Column 10, line 18, for "point" read *points*; and that the said Letters Patent should be read with this correction therein that the same may conform to the record of the case in the Patent Office.

Signed and sealed this 30th day of September, A. D. 1947.

[SEAL]

THOMAS F. MURPHY,
*Assistant Commissioner of Patents.*